United States Patent [19]

Mura

[11] Patent Number: 4,907,472
[45] Date of Patent: Mar. 13, 1990

[54] POWER TRANSMITTING SYSTEM FOR A FOUR-WHEEL DRIVE VEHICLE

[75] Inventor: Shinichiro Mura, Mitaka, Japan

[73] Assignee: Fuji Jukogyo Kabushiki Kaisha, Tokyo, Japan

[21] Appl. No.: 185,429

[22] Filed: Apr. 25, 1988

[30] Foreign Application Priority Data

Apr. 30, 1987 [JP] Japan ................... 62-107268

[51] Int. Cl.4 .................. F16H 37/08; F16H 1/44; B60K 17/35
[52] U.S. Cl. .................... 475/89; 180/249; 475/206
[58] Field of Search ............ 74/711, 701; 180/248, 180/249

[56] References Cited

U.S. PATENT DOCUMENTS

| | | | |
|---|---|---|---|
| 2,743,792 | 5/1956 | Ransom | 74/711 |
| 3,923,113 | 12/1975 | Pagdin | 74/711 X |
| 4,058,027 | 11/1977 | Webb | 74/711 |
| 4,601,359 | 7/1986 | Weismann et al. | 180/248 |
| 4,718,300 | 1/1988 | Magg | 74/711 X |
| 4,750,382 | 6/1988 | Marc | 74/701 |
| 4,756,381 | 7/1988 | Renaudin | 180/249 |

FOREIGN PATENT DOCUMENTS 59-179425 10/1984 Japan .
1357106 6/1974 United Kingdom ............. 74/711

OTHER PUBLICATIONS

"Automotive Drive Trains" by Thiessen and Dales, 1984, Reston Publishing Co., Reston, Virginia, pp. 76 and 77.

Primary Examiner—Leslie A. Braun
Assistant Examiner—Harold F. Macris
Attorney, Agent, or Firm—Martin A. Farber

[57] ABSTRACT

A power transmitting system for a four-wheel drive vehicle has a transmission, a central differential, and a viscous coupling. The viscous coupling is provided coaxially with the central differential, and a drive shaft is provided passing through axes of the central differential and the viscous coupling. An output shaft of the transmission is operatively connected to the casing of the differential. One of the differential gears is operatively connected to rear wheels of the vehicle through the drive shaft, and the other differential gear is secured to a housing of the viscous coupling. The housing is operatively connected to front wheel of the vehicle and the hub is secured to the drive shaft.

10 Claims, 2 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine to four driving wheels of a four-wheel drive vehicle.

In a conventional four-wheel drive vehicle having a central differential, which is called a full time four-wheel drive vehicle, the central differential operates to uniformly distribute the torque of an engine to the front wheels and to the rear wheels of the vehicle.

However, if one of the four wheels skids, the torque is not transmitted to the four wheels, so that the vehicle stops. In order to prevent such a problem, a lock mechanism for locking the central differential is provided.

As a lock mechanism for the system, a system employing a solenoid-operated dog clutch is known. Further, Japanese Patent Application Laid-Open No. 59-179425 discloses a system in which the front wheels are connected to the rear wheels by a fluid clutch or a viscous clutch. When the rotational speeds of the rear wheels are lower than a predetermined speed range compared with those of the front wheels, the rear wheels are driven by the power for the front wheel drive through a one-way clutch.

However in the former case, since the clutch is operated by a driver in accordance with conditions of the surface of a road, it causes troublesome operation.

In the latter system, it is difficult to determine the capacity of the viscous clutch for setting a viscous mode and a hump mode. Further, in order to obtain an appropriate operational characteristic, the viscous clutch must have a comparatively large capacity.

SUMMARY OF THE INVENTION

The object of the present invention is to provide a power system which is compact in size and automatically operates to restrict the differential operation of the central differential in accordance with driving conditions.

The other objects and features of this invention will become understood from the following description with reference to the accompanying drawings.

DETAILED DESCRIPTION OF THE PREFERRED EMBODIMENT

Figure 1:
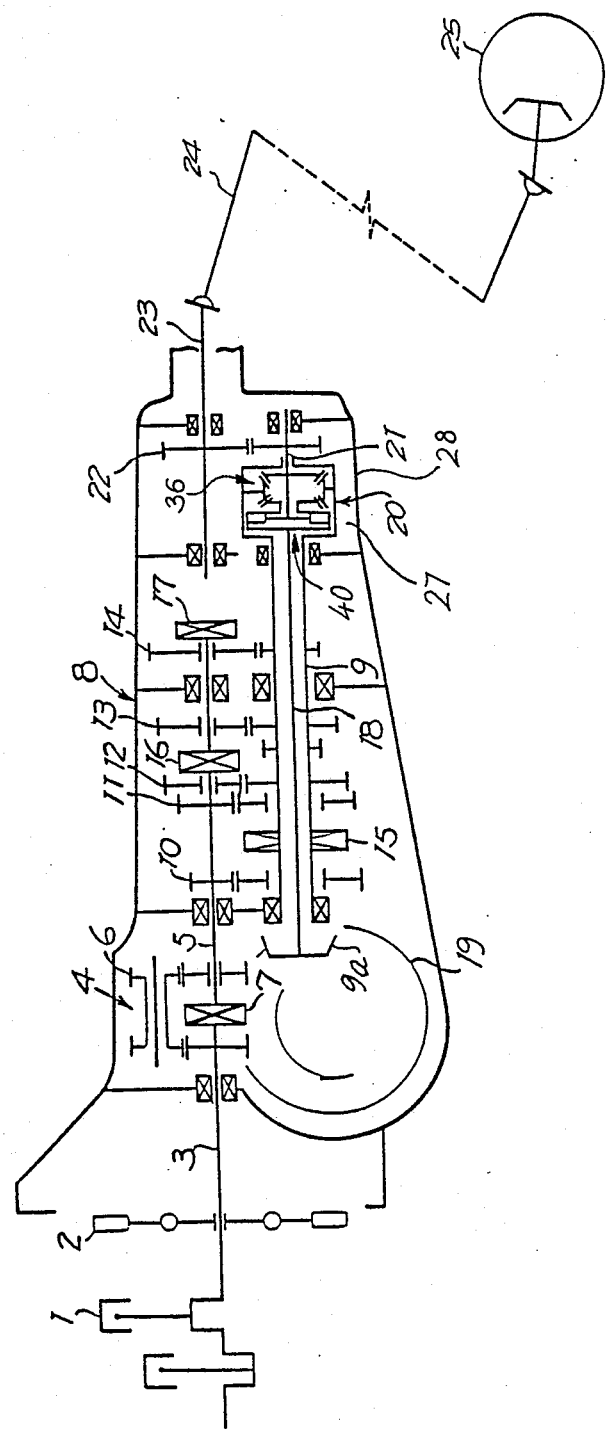
FIG. 1 is a schematic diagram of a four-wheel drive power transmission system of the present invention.

FIG. 1 shows a power transmission system for a four-wheel drive motor vehicle to which the present invention is applied. An engine 1 is longitudinally mounted on the motor vehicle at a front portion thereof, thus forming a transaxle type. The power transmission system housed in a transmission case comprises a clutch 2, sub-transmission 4, main transmission 8 and transfer device 20. The sub-transmission 4 connected to the clutch 2 through a drive shaft 3 has a reduction gear 6 disposed between the drive shaft 3 and an input shaft 5, and a selector mechanism 7. The sub-transmission 4 is adapted to selectively operate to directly engage the drive shaft 3 with the input shaft 5 for providing a high speed range and respectively to engage the drive shaft 3 with the input shaft 5 bypassing the reduction gears 6 for providing a low speed range. The main transmission 8 connected to the input shaft 5 has a tubular output shaft 9 parallel with the input shaft 5, five pairs of change-speed gears 10 to 14 corresponding to first to fifth speed gears, synchronizers 15 to 17, and a reverse drive gear (not shown). A front drive shaft 18 is rotatably supported in the output shaft 9. A drive pinion 9a at the front end of the shaft 18 meshes with a crown gear of a front differential 19 so as to transmit the power to front wheels of the vehicle.

The transfer device 20 is disposed behind the main transmission 8 at the rear end of the output shaft 9 and comprises a central differential 36 and a viscous coupling 40. The transfer device 20 has a drive shaft 21 disposed in alignment with the front drive shaft 18, and is connected to a rear drive shaft 12 through transfer gear 22. The rear drive shaft 23 is disposed in parallel with the front drive shaft 18. The rear drive shaft 23 is connected to rear wheels of the vehicle through a propeller shaft 24 and a rear differential 25. Accordingly, torque of the engine is distributed to the front wheels and rear wheels, and the difference between the rotational speeds of these wheels is absorbed.

Figure 2:
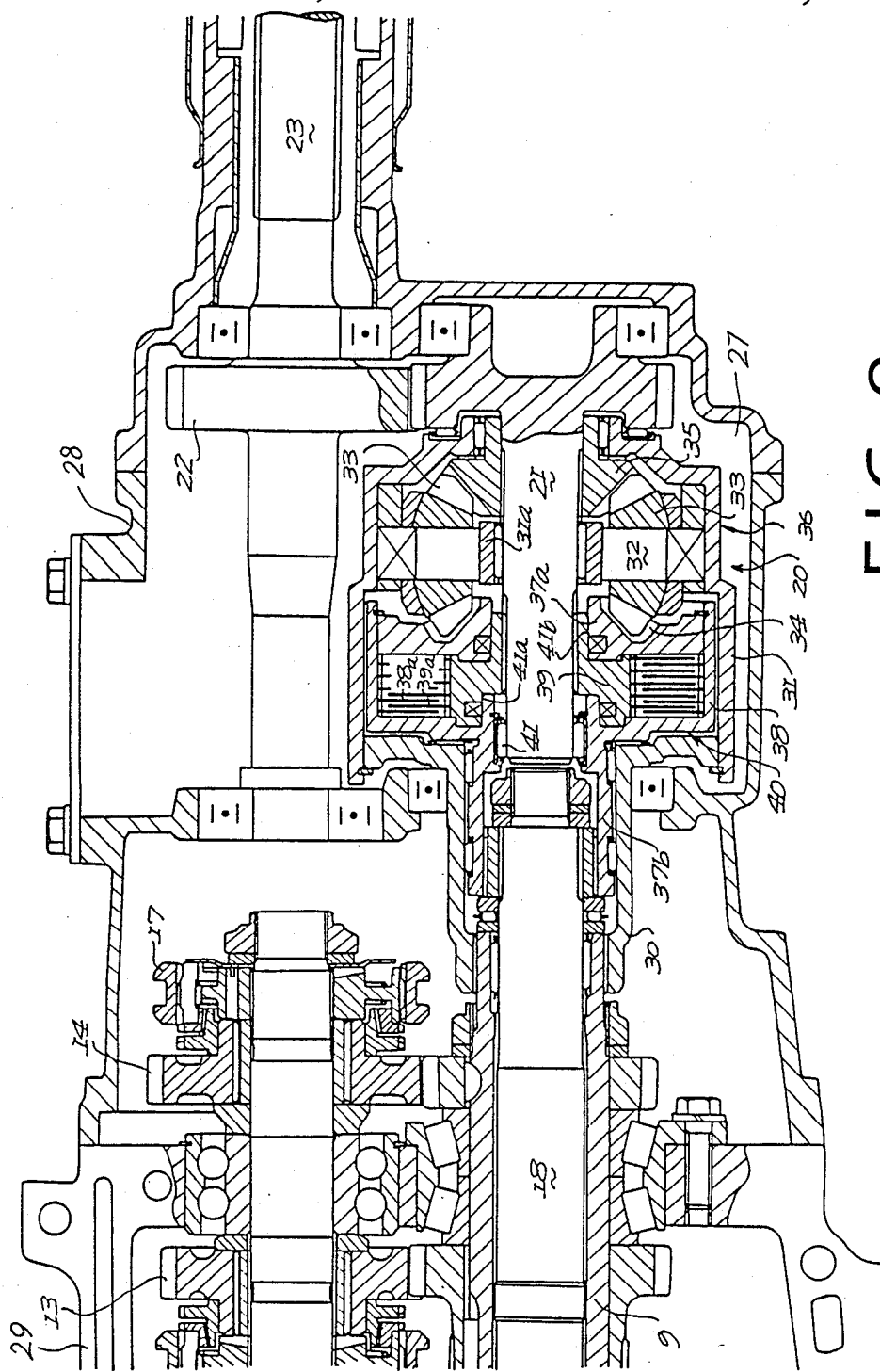
FIG. 2 is an enlarged sectional view showing a part of the system.

Referring to FIG. 2, the transfer device 20 is provided in a chamber 27 formed in an extension case 28 secured to a transmission case 29, and further has a front cylindrical casing 30 mounted on the output shaft 9 and a differential casing 32 connected to the front casing 30. In the casing 31, which also can be considered a part of the central differential 36, the central differential 36 and the viscous coupling 40 are provided coaxially with the drive shaft 21.

The central differential 36 comprises a pair of pinion shafts 32, each secured to the casing 31 and a center ring 31a which is rotatably mounted on the shaft 21, and a pair of pinion gears 33, each rotatably mounted on one of the pinion shafts. A differential gear 35 meshes with the pinion gears 33 and is securely mounted on the drive shaft 21, and a differential gear 34 meshes with the pinion gears 33.

The viscous coupling 40 comprises a housing 38 having a plurality of outer disks 38a, a tubular output shaft 37b integral with the housing 38 and secured to the front drive shaft 18, a hub 39 secured to the drive shaft 21 and having a plurality of inner disks 39a, an input shaft 37a integral with the differential gear 34 and secured to the housing 38, and a high viscous fluid contained in a space defined by the hub 39, the shaft 37a and the housing 38. The disks are alternately arranged in the axial direction of the coupling 40. When there is a speed difference between the housing 38 and the hub 39, the viscous coupling 40 operates to generate torque in dependency on the difference. Thus, the torque is transmitted from a higher speed disk side to a lower speed disk side. A bearing 41 is disposed between the housing 38 and the drive shaft 21 for providing appropriate clearances 41a, 41b between the hub 39 and the housing 38 and between the hub 39 and the shaft 37a.

The power of the engine 1 is transmitted to the sub-transmission 4 through the clutch 2 and the drive shaft 3, and further to the main transmission 8. The torque of the main transmission 8 is transmitted to pinion gears 33 of the differential 36 through the output shaft 9, front casing 30, differential casing 31, and pinion shafts 32. At normal driving, the torque is transmitted to the front wheels through differential gear 34, shaft 37a, housing 38, output shaft 37b, and front drive shaft 18. The torque is further transmitted to the rear wheels through differential gear 35, drive shaft 21, transfer gears 22, rear drive shaft 23, propeller shaft 24 and rear differential 25.

When the rear wheels skid, a speed difference between the front and rear wheels occurs. The torque of the rear drive shaft 23 is transmitted to the drive shaft 21. The hub 39 secured to the drive shaft 21 rotates faster than the housing 38. The difference of the rotational speeds between the outer disks 38a and inner disks 39a generates a coupling torque which is transmitted to the lower speed side, namely to the outer disks 38a. Accordingly, the torque is transmitted to the differential gear 34, thereby preventing the pinion gears 33 from rotating. Thus, the differential operation is restricted.

This means that the central differential 36 is automatically locked. In case of skidding of the front wheels, the central differential is locked in a similar manner to the above described operation.

From the foregoing, it will be understood that the present invention provides a system in which a viscous coupling is combined with a central differential for automatically locking the central differential. The viscous coupling is combined with the central differential to achieve a compact structure, so that an increase in the size of the transmission is prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A power transmitting system for a four-wheel drive vehicle with a pair of front wheels and a pair of rear wheels, comprising a transmission housed in a transmission case for operatively transmitting power of an engine to said pair of front and rear wheels, respectively, central differential means for permitting a difference in speed between said front and rear wheels, and viscous coupling means for restricting the difference in speed between said front and rear wheels at a skidding condition of the front or rear wheels, the system comprising, output means mounted on the transmission comprising an outer cylindrical shaft for supplying output torque of the transmission to the central differential means and comprising an inner shaft rotatably mounted in said outer cylindrical shaft for supplying output torque of the viscous coupling means to one of the front and rear wheels, said central differential means including a differential casing connected to said outer cylindrical shaft, a first differential gear on a central differential output drive shaft for supplying an output torque thereof to the other of said front and rear wheels, a second differential gear, at least a pair of pinion shafts secured to said differential casing, and pinion gears rotatably mounted on said pair of pinion shafts, respectively, and meshing with both of said differential gears, respectively, an extension case, forming a central differential chamber, provided at one end of the transmission case for containing said central differential means in said central differential chamber, said differential casing extending so as to contain said viscous coupling means, said viscous coupling means being disposed in said differential casing and comprising a housing secured with said inner shaft at one end and secured to said second differential gear at another end thereof, and a hub secured to the central differential output drive shaft, said hub and said housing having cooperating viscous coupling disks, and said housing being rotatably mounted on the output drive shaft through a bearing.

2. The system according to claim 1, wherein
   said viscous coupling means and said central differential means are coaxially disposed closely adjacent each other, said first and second differential gears and said pinion gears being disposed in said differential casing.

3. The system according to claim 2, wherein
   said viscous coupling means includes an input shaft connected to said second differential gear and to said housing, and an output shaft connected to said housing and to said inner shaft.

4. The system according to claim 1, wherein
   said differential casing concentrically extends close to and about said housing of said viscous coupling means.

5. The system according to claim 4, wherein
   said viscous coupling means and said central differential means constitute a transfer device, the latter including a front cylindrical casing connected to said differential casing and connected to said outer cylindrical shaft.

6. A power transmitting system for a four-wheel drive vehicle with a pair of front wheels and a pair of rear wheels, comprising a transmission housed in a transmission case for operatively transmitting power of an engine to said pair of front and rear wheels, respectively, central differential means for permitting a difference in speed between said front and rear wheels, and viscous coupling means for restricting the difference in speed between said front and rear wheels at a skidding condition of the front or rear wheels, the system comprising, output means mounted on the transmission comprising an outer cylindrical shaft for supplying output torque of the transmission to the central differential means and comprising an inner shaft rotatably mounted in said outer cylindrical shaft for supplying output torque of the viscous coupling means to one of the front and rear wheels, said central differential means including a differential casing connected to said outer cylindrical shaft, a first differential gear on a central differential output drive shaft for supplying an output torque thereof to the other of said front and rear wheels, a second differential gear, at least a pair of pinion shafts secured to said differential casing, and pinion gears rotatably mounted on said pair of pinion shafts, respectively, and meshing with both of said differential gears, respectively, an extension case, forming a central differential chamber, provided at one end of the transmission case for containing said central differential means in said central differential chamber, said differential casing extending so as to contain said viscous coupling means, said viscous coupling means being disposed in said differential casing and comprising a housing secured with said inner shaft at one end and secured to said second differential gear at another end thereof, and a hub secured to the central differential output drive shaft, said hub and said housing having cooperating viscous coupling disks, and each pinion shaft being secured to a ring which is rotatably mounted on the output drive shaft.

7. The system according to claim 6, wherein said viscous coupling means and said central differential means are coaxially disposed closely adjacent each other, said first and second differential gears and said pinion gears being disposed in said different casing.

8. The system according to claim 7, wherein said viscous coupling means includes an input shaft connected to said second differential gear and to said housing, and an output shaft connected to said housing and to said inner shaft.

9. The system according to claim 6, wherein said differential casing concentrically extends close to and about said housing of said viscous coupling means.

10. The system according to claim 9, wherein said viscous coupling means and said central differential means constitute a transfer device, the latter including a front cylindrical casing connected to said differential casing and connected to said outer cylindrical shaft.

* * * * *